United States Patent

[11] 3,578,027

| | | |
|---|---|---|
| [72] | Inventor | William L. Zopfi<br>593 Pleasant, Ferndale, Mich. 48220 |
| [21] | Appl. No. | 846,148 |
| [22] | Filed | July 30, 1969 |
| [45] | Patented | May 11, 1971 |

[54] SEALING PLUGS OR CLOSURES
1 Claim, 10 Drawing Figs.

[52] U.S. Cl.................................................. 138/89, 220/42, 277/208
[51] Int. Cl.................................................. F16l 55/10
[50] Field of Search.......................................... 138/89-—96, (Inquired); 277/207 (A), 208, (Inquired); 215/47, (Inquired); 220/42 (B), 42 (C)

[56] References Cited
UNITED STATES PATENTS

| 3,016,722 | 1/1962 | Batdorf | 277/208 |
| 3,348,719 | 10/1967 | Rausing et al. | 215/47 |
| 3,352,212 | 11/1967 | Read | 277/208 |

*Primary Examiner*—Houston S. Bell, Jr.
*Attorney*—Cullen, Sloman & Cantor

ABSTRACT: A molded rubberlike sealing plug or closure formed of a semihard rubberlike material for closing a pipe end or the like is formed with tapered ribs on its peripheral surface.

PATENTED MAY 11 1971 3,578,027

INVENTOR
WILLIAM L. ZOPFI
BY Cullen, Sloman, & Cantor
ATTORNEYS

PATENTED MAY 11 1971  3,578,027

INVENTOR
WILLIAM L. ZOPFI

BY Cullen, Sloman, & Cantor
ATTORNEYS

SEALING PLUGS OR CLOSURES

GENERAL DESCRIPTION

This application relates to sealing plugs or closures such as are used for closing pipe ends or nipples of pipes.

The invention is generally described as a sealing plug or closure means formed of a semihard rubberlike material whether it be of natural or synthetic rubber, polychloroprene, or the like. The closure means further, is generally in the form of a large diameter relatively thick disc. Illustrative dimensions are given, for example, as about 5 inches diameter and about 1½ inches thick. Various sizes are contemplated. The sealing plug is generally in the form of a disc having flat upper and lower surfaces and a peripheral surface.

The improvement comprises a series of flexible parallel ribs on the peripheral wall which will hereafter be described in greater detail, upon reference to the drawings attached to this specification.

DETAILED DESCRIPTION

Figure 3:
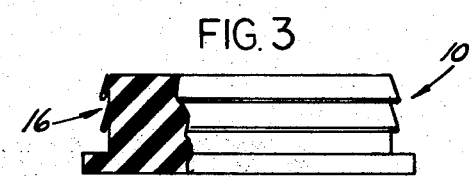
FIG. 3 is a view like FIG. 1 but showing a plug identified as an untapered style.
Figure 4:
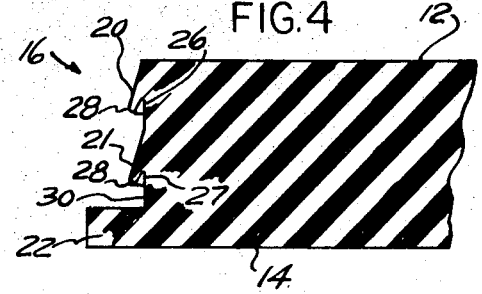
FIG. 4 is a large scale view of a fragment of the plug of FIG. 3.

FIGS. 3 and 4 show a plug as generally described above which may be used as a closure means for a tubular opening such as a pipe end or a pipe nipple end. The plug reference 10 is of any suitable material; preferably, a semihard rubberlike material whether it be of natural or synthetic rubber, polyvinylchloride polyurethane, polychloroprene or the like.

The plug is generally in the form of a large diameter relatively thick disc. Illustrative dimensions are given as about 5 inches diameter and 1½ inches thick, but not excluding other sizes. The plug is in the form of a disc and has flat upper and lower surfaces 12 and 14 and a peripheral surface 16.

THE IMPROVEMENT

The peripheral surface has a series of parallel ribs 20, 21 and 22 in the form shown in FIGS. 3 and 4. The upper ribs 20 and 21 are tapered as shown and undercut as shown at 26 and 27 to provide flexing sealing fins 28 at their lower edges.

The lower most rib 22 is squared and untapered.

FIGS. 3 and 4 show the plug having in addition, an untapered body surface 30 between the lower most of the tapered ribs 21 and the squared rib 22.

Figure 1:
FIG. 1 is a small scale view of one style of plug in partial cross section and identified as a tapered style plug.
Figure 2:
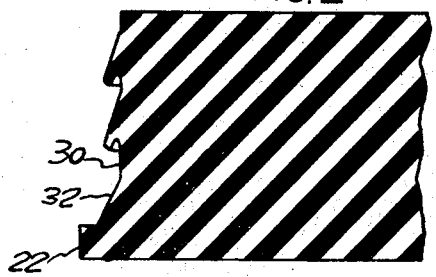
FIG. 2 is a fragmentary larger scale view of the plug of FIG. 1.

FIGS. 1 and 2 show a plug having in addition to all of the parts of the plugs of FIGS. 3 and 4 in a tapered body surface 32 between the untapered body surface 30 and the squared rib 22.

VARIATIONS IN RIB FORM

Figure 5:
FIG. 5 is a large scale fragmentary view of a sharp fin type of plug.

FIG. 5 shows that a variant wherein the upper tapered ribs 20 and 21 have their lower edges formed in a manner that their fin edges are square to provide sharp tapered fins.

Figure 6:
FIG. 6 is a large scale fragmentary view of a square fin type of plug.

FIG. 6 shows a variant wherein the fin edges 38 are square to provide square fin edges.

Figure 7:
FIG. 7 is a large scale fragmentary view of a round fin type of plug.

FIG. 7 shows a variant wherein the fin edges 40 are round as illustrated.

USES IN GENERAL

Figure 8:
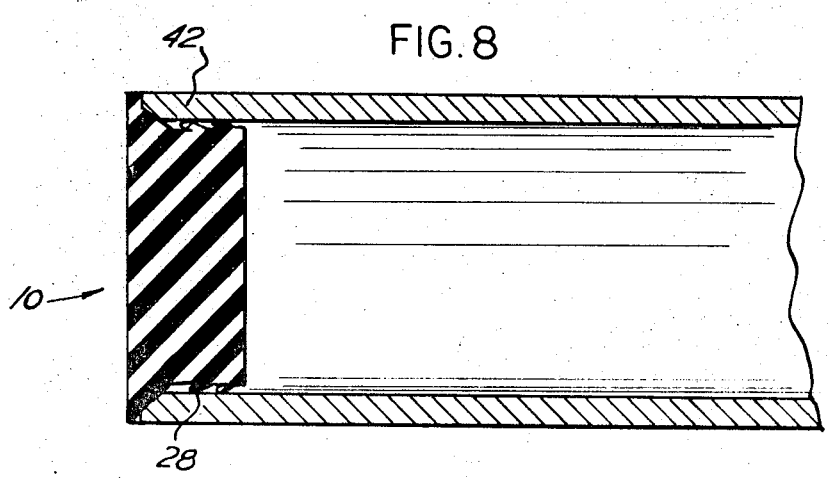
FIG. 8 shows the tapered type of plug of FIGS. 1 and 2 in a tapered pipe end to small scale.

FIG. 8 shows the tapered type of plug of FIGS. 1 and 2 in a tapered pipe end 42. The ribs, on assembly, are flexed into snug sealing engagement with the pipe.

Figure 9:
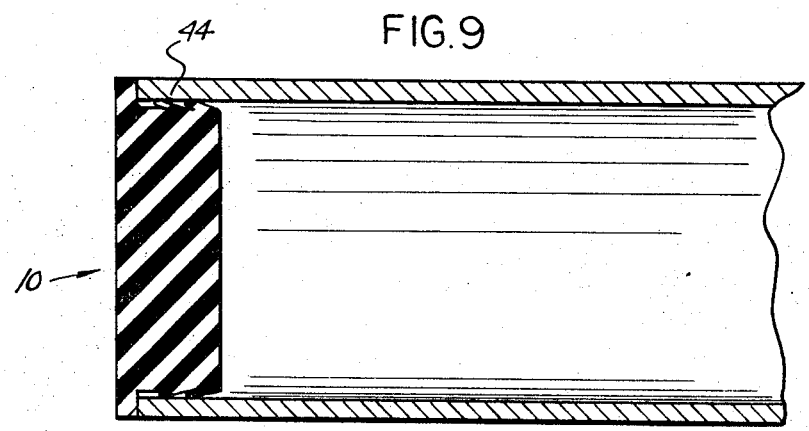
FIG. 9 is a similar view but showing the use of the untapered type of plug of FIGS. 3 and 4.

FIG. 9 shows the untapered type of plug of FIGS. 3 and 4 in an untapered pipe end 44.

Figure 10:
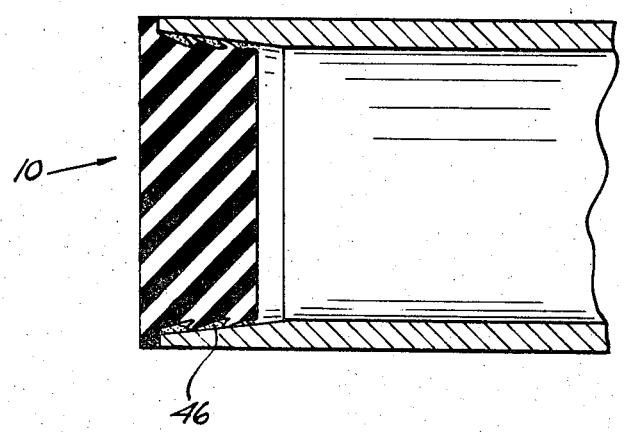
FIG. 10 is a view like FIG. 8 but showing the plug as secured in place with the aid of adhesive.

FIG. 10 is a view like FIG. 8 but showing a body of suitable adhesive 46 in place. Such adhesive may be of any suitable form such as the polyvinylchloride type or the resin type or a mixture of polyvinylchlorides and resins available on the market.

COMMERCIAL USES

The sealing plugs hereof in one form or another may be used in a variety of pipes such as those made of asbestos cement, fiber, plastic, or metal; and in a variety of identifications of pipe ends such as spigot ends, couplings, adapters, bell ends of ceramic types, hub ends of metal pipes, pipe ends known as closet stubs, drain pipe openings, duct type openings, conduit pipe openings, sewer pipe openings, lateral stubs, drain pipes, and wherever it is used or desired to close a pipe end.

It will serve to prevent entry of foreign matter and may be also used as a temporary closure for pressure testing of a pipe since it will withstand a very substantial pressure because of the firm seal provided by the sealing plug.

While the dimensions herein illustrated and the forms herein illustrated are provided for illustrative purposes only with some of them having been embodied in actual form, it will be understood that variations within the spirit of the invention may readily be contemplated, it being intended that the material herein given is provided for illustrative purposes only and not by way of limitation and it, further, being understood that the scope of the invention is determined primarily by the claims which follow.

FUNCTIONING

The upper tapered rib 20 is a starting rib for the insertion of the plug into a pipe end.

The flexing sealing edges or thin edges 28 provide flexing seals between the sealing plug and the pipe end with the flexing action being enhanced by the undercut which forms the lower edges of the ribs as fins, whether they be sharp, square or round.

The tapered rib 32 of the form of FIGS. 1 and 2, adjacent the squared rib 22 forms a final tapered-type seal with the pipe end.

The squared rib 22 forms a final closing rib and also functions mainly as a protective covering for the annular edge of the pipe end on the flat surface of such edge and because of the flexibility of the material of the sealing plug, will in many instances, desirably lip over the edge of the pipe end to enhance the sealing action.

I claim:

1. A sealing plug and cap for the end of a thin wall pipe comprising a semihard rubberlike material, whether of natural or synthetic rubber, polychloroprene, or the like, with said plug being a large diameter relatively thick disc, of dimensions illustratively given as about 5 inches in diameter and 1½ inches in thickness;

with said disc having flat upper and lower surfaces and a peripheral surface; for fitting inside the pipe end;

said peripheral surface having a series of parallel ribs; for entering the pipe end and abutting the interior of the pipe to seal it; with the upper ribs tapered and undercut to provide flexing sealing fins at their lower edges;

with the lowermost rib or flange being square and untapered, and of a diameter greater than that of the other ribs of the plug so as to seal and cap the edge of the pipe and remain outside the pipe end; with such cap rib having an outside diameter substantially equal to the outside diameter of the pipe end so as to cap it, without projecting laterally beyond the pipe.